(12) United States Patent
James (10) Patent No.: US 9,441,906 B2
(45) Date of Patent: Sep. 13, 2016

(54) POLE SPEAR STORAGE AND LAUNCHING DEVICE

(71) Applicant: Brian Lee James, Venice, FL (US)

(72) Inventor: Brian Lee James, Venice, FL (US)

(73) Assignee: Brian Lee James, Venice, FL (US)

( * ) Notice: Subject to any disclaimer, the term of this patent is extended or adjusted under 35 U.S.C. 154(b) by 0 days.

(21) Appl. No.: 14/859,459

(22) Filed: Sep. 21, 2015

(65) Prior Publication Data

US 2016/0084609 A1 Mar. 24, 2016

Related U.S. Application Data

(60) Provisional application No. 62/052,811, filed on Sep. 19, 2014.

(51) Int. Cl.
*F41B 3/02* (2006.01)
*F41B 7/04* (2006.01)
*A01K 81/06* (2006.01)
*F41B 13/10* (2006.01)

(52) U.S. Cl.
CPC ............. *F41B 3/02* (2013.01); *A01K 81/06* (2013.01); *F41B 7/04* (2013.01); *F41B 13/10* (2013.01)

(58) Field of Classification Search
CPC ............ F41B 3/02; F41B 7/04; A01K 81/06
USPC ................................. 124/17, 20.1, 20.3, 22
See application file for complete search history.

(56) References Cited

U.S. PATENT DOCUMENTS

| | | | | |
|---|---|---|---|---|
| 181,891 | A | * | 9/1876 | Algeo ............... F41B 7/04 124/22 |
| 306,422 | A | * | 10/1884 | Peters ............... F41B 7/04 124/22 |
| 1,379,944 | A | * | 5/1921 | Story ............... F41B 3/02 124/22 |
| 2,000,146 | A | * | 5/1935 | Penn ............... F42B 30/14 124/26 |

(Continued)

*Primary Examiner* — Alexander Niconovich
(74) *Attorney, Agent, or Firm* — MH2 Technology Law Group, LLP (57) ABSTRACT

A device for launching and storing a spear. The device includes a barrel having a muzzle end and an action end. The barrel is configured to slidably receive at least a portion of the spear through the muzzle end and the action end, such that a tip of the spear is positioned within the barrel and an end of the spear extends out of the barrel through the action end. The device also includes a handle coupled with the barrel and extending at a non-zero angle to the barrel. The handle includes a grip that is configured to be gripped by a user when launching the spear, and a protective guard coupled with the grip and extending therefrom at least partially in a direction toward the muzzle end of the barrel.

20 Claims, 6 Drawing Sheets

(56) References Cited

U.S. PATENT DOCUMENTS

| | | | | |
|---|---|---|---|---|
| 2,522,060 A | * | 9/1950 | Ridland | F41B 7/04 124/22 |
| D172,227 S | * | 5/1954 | Fisher | F41B 3/02 D22/102 |
| 3,194,226 A | * | 7/1965 | Hoff | F41B 3/02 124/22 |
| 3,455,288 A | * | 7/1969 | Knerr | F41B 3/02 124/22 |
| 3,865,094 A | * | 2/1975 | Sweeney | F41B 3/02 124/20.1 |
| 4,014,125 A | * | 3/1977 | Baldi | A01K 81/00 124/22 |
| 4,265,212 A | * | 5/1981 | Wolf | F41B 3/02 124/20.1 |
| 4,297,985 A | * | 11/1981 | Rodriguez | F42B 6/04 124/22 |
| 4,437,449 A | * | 3/1984 | Attanasio | F41B 3/02 124/22 |
| 4,573,445 A | * | 3/1986 | Webb | F41B 3/02 124/22 |
| D297,041 S | * | 8/1988 | Bongiorni | F41B 3/02 D22/102 |
| 5,125,388 A | * | 6/1992 | Nicely | F41B 3/02 124/20.1 |
| 5,524,603 A | * | 6/1996 | Menzer | F41B 7/04 124/20.3 |
| 5,619,978 A | * | 4/1997 | Flournoy | F41B 3/02 124/20.1 |
| 7,448,371 B2 | * | 11/2008 | Sapir | F41B 3/005 124/16 |
| 7,506,642 B2 | * | 3/2009 | Edwards | F41B 3/02 124/20.1 |
| 9,234,718 B2 | * | 1/2016 | Ricke | F41B 3/02 |
| 2012/0085330 A1 | * | 4/2012 | Hickerson | A01K 81/04 124/22 |
| 2014/0165981 A1 | * | 6/2014 | Lien | F41B 5/1403 124/20.3 |
| 2015/0136103 A1 | * | 5/2015 | Thornbrough | A01K 81/06 124/22 |
| 2015/0204633 A1 | * | 7/2015 | Nelson | F41B 7/04 124/22 |
| 2016/0061552 A1 | * | 3/2016 | Nicely | F41B 7/04 124/22 |

* cited by examiner

POLE SPEAR STORAGE AND LAUNCHING DEVICE

CROSS-REFERENCE TO RELATED APPLICATIONS

This application claims priority to U.S. Provisional Patent Application having Ser. No. 62/052,811, which was filed on Sep. 19, 2014.

BACKGROUND

There are several different types of devices that are used to launch a spear underwater. Generally, they are broken into three groups: spearguns, pole spears, and Hawaiian slings. Within these groups, designs vary. In general terms, however, a speargun is a device in which a spear, typically with a barbed tip, is loaded into a barrel. The spear is held in the barrel by a catch that is coupled to a trigger. An elastic rubber tube or band can be stretched and attached to the spear, or a pneumatic chamber can be loaded. Upon depressing the trigger, energy from either such driver is released to launch the spear from the gun. A line and reel are also typically attached to the spear, to recover the spear after a launch.

By contrast, a pole spear more simply includes a shaft with a sharpened tip on one end and a rubber sling on the other. With one hand, a user grips the spear shaft as well as the rubber sling. With his or her second hand, the user pulls back the sling-end of the pole spear, creating tension in the sling. When the user's second hand releases the spear, the spear is propelled forward as the tension in the sling is released, until the sling itself, still held by the first hand, stops the progress of the pole spear.

A Hawaiian sling provides a tubular handle with a hole in the middle, through which the shaft of a spear is received. The elastic band is attached to the tubular handle, and is engaged with the end of the spear, opposite to the point end thereof. A user then holds the handle with one hand, and pulls back the spear and band with the other, and then releases, propelling the spear out of the handle. Like the spear gun, the Hawaiian sling is typically not attached to the elastic member after it is propelled therefrom.

Each of these devices has been used for spearfishing a variety of different types of game fish. In recent years, they have also been used to hunt lionfish (certain species of the genus *Pterois*), which are invasive and damaging to the environment of the Western Atlantic (e.g., eastern U.S., Caribbean, and South America). The lionfish has few or no natural predators in these environments, but is a successful predator itself. Further, the lionfish have venomous fin rays, which are capable of delivering a potent sting.

Potentially as a consequence of a lack of predators, the lionfish tend to remain stationary, even in the presence of human SCUBA divers. This makes them relatively easy targets for eradication efforts. However, spearguns, as well their spears, are expensive and may be too powerful for such close-up shots, leading to over-penetration and damage to the spears and/or coral or other objects behind the lionfish. Hawaiian slings and pole spears may avoid this drawback, but each generally require an exposed shaft point, which can be dangerous to the spear-fisherman and/or to other divers, and may be inconvenient, especially if use of the pole spear or Hawaiian sling is not the primary purpose of the dive. Further, these devices, while allowing for a relatively low-velocity, close-up shot, may expose the diver to a risk of being stung by the lionfish, either while supporting the spear/handle and drawing back the spear, or when collecting and removing the lionfish from the spear after a successful shot.

What is needed then is a safe and effective device for relatively close range shots, e.g., for spearing lionfish, that protects users from inadvertently puncturing themselves or others with the point of the spear, and from stings by the lionfish (or any other quarry taken by the device).

SUMMARY

It will be appreciated that the following summary is intended merely to introduce a subset of the aspects of embodiments of the present disclosure and thus is not to be considered limiting.

Embodiments of the disclosure may provide a device for launching and storing a spear. The device includes a barrel having a muzzle end and an action end. The barrel is configured to slidably receive at least a portion of the spear through the muzzle end and the action end, such that a tip of the spear is positioned within the barrel and an end of the spear extends out of the barrel through the action end. The device also includes a handle coupled with the barrel and extending at a non-zero angle to the barrel. The handle includes a grip that is configured to be gripped by a user when launching the spear, and a protective guard coupled with the grip and extending therefrom at least partially in a direction toward the muzzle end of the barrel.

BRIEF DESCRIPTION OF THE DRAWINGS

The present disclosure may best be understood by referring to the following description and accompanying drawings that are used to illustrate some embodiments. In the drawings.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Figure 1:
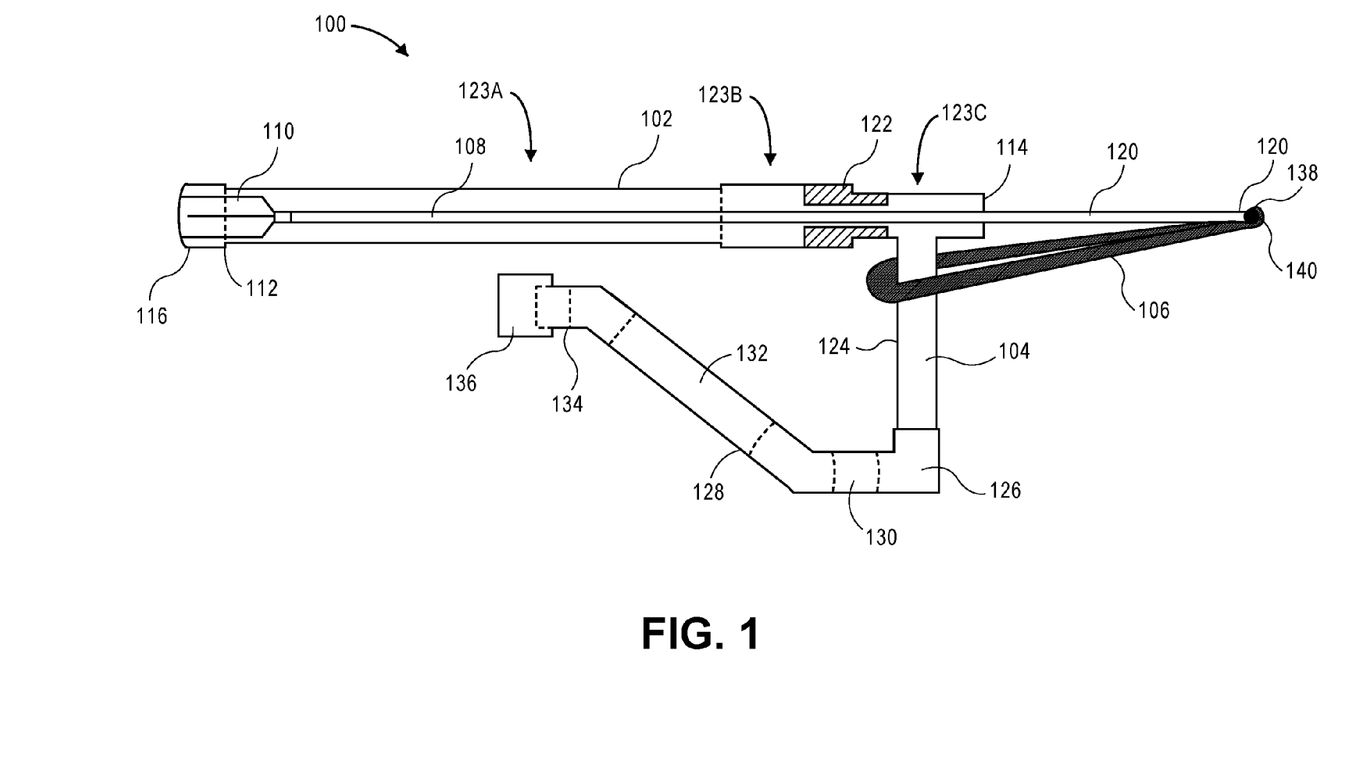
FIG. 1 illustrates a side, partially cross-sectional view of a spear launching device, including a spear loaded therein, according to an embodiment.

FIG. 1 illustrates a side view of a spear launching device 100, according to an embodiment. In some applications, the spear launching device 100 may be employed for spearing lionfish, but may be readily applied for hunting other quarry. The spear launching device 100 may generally include a barrel 102 and a handle 104. Further, the device 100 may be employed in combination with, or at least for use with, an elastic member 106 and a spear 108.

The barrel 102 is illustrated in cross-section for ease of description, but may be transparent, translucent, or opaque in various implementations. Further, the barrel 102 may be configured to receive the spear 108 therein. The spear 108 may be any suitable type of spear, such as a three-pronged "trident" tip type of spear, or any other type of spear, e.g., with flexible barbs. In an embodiment, the barrel 102 may be sized to accommodate such spears 108 with a minimal amount of drag force applied by the tip 110 on the barrel 102. The barrel 102 may be made from a plastic, such as polyvinyl chloride (PVC), or another plastic. In other embodiments, the barrel 102 may be made from other materials, such as fiber-reinforced materials (i.e., "composites"), metals such as aluminum, and/or the like.

The barrel 102 may further include a muzzle end 112 and an action end 114. The muzzle end 112 may be generally open, so as to allow unobstructed pass-through of the spear 108 when launching the spear 108 from the barrel 102. In an embodiment, the barrel 102 may receive an end cap 116 over the muzzle end 112 when the device 100 is not in use. This may retain at least the tip 110 of the spear 108 within the barrel 102, thereby protecting the user and those around the user from accidental injury from contact with the tip 110.

The end cap 116 may be removable, such as by sliding, twisting, screwing or otherwise displacing the end cap 116 from the barrel 102.

The action end 114 of the barrel 102 may either be open, as shown, or may be substantially closed and including an aperture therethrough, which may be sized to allow a shaft 120 of the spear 108 to be slidably received therethrough. For example, such an aperture may be circular, or otherwise shaped complementary to the shaft 120, and may be sized slightly bigger than the shaft 120.

The device 100 may also include a reducer 122 positioned within the barrel 102. The reducer 122 may include a bushing, and may reduce the open diameter in the barrel 102 from approximately the size of the tip 110 to approximately the size of the shaft 120. For example, the reducer 122 may have an inner diameter that is slightly larger than the shaft 120, so as to freely allow the shaft 120 to slide therethrough. The reducer 122 may thus serve to guide the shaft 120 during the shot, which may reduce wobble of the shaft 120 during its expulsion through the muzzle end 112. Further, in embodiments in which the action end 114 of the barrel 102 is open, the reducer 122 may block the tip 110 of the spear 108 from proceeding therethrough, which may, along with the end cap 116, entrain the tip 110 of the spear 108 within the barrel 102.

The reducer 122 may be made from a plastic, such as polyvinyl chloride (PVC), acrylic, metal (e.g., aluminum), or another material, and may be transparent, translucent, or opaque. In some embodiments, the reducer 122 may be positioned between the muzzle end 112 and a connection between the barrel 102 and the handle 104, as shown, but in other embodiments, may be positioned elsewhere in the barrel 102.

In an embodiment, the barrel 102 may include a first diameter section 123A, a second diameter section 123B, and a third diameter section 123C. The first diameter section 123A may have a first diameter, and may generally extend between the reducer 122 and the muzzle end 112. The barrel 102 may transition to a larger, second diameter in the second diameter section 123B, near the reducer 122, to accommodate the reducer 122, at least in some embodiments. The barrel 102 may then transition to the third diameter section 123C having a third diameter, smaller than the first diameter, between the reducer 122 and the action end 114. In an embodiment, the handle 104 may generally have the same diameter as the third diameter section 123C. This relative dimensioning is illustrated in FIG. 1, but other relative dimensioning is contemplated.

Referring to the particular dimensions, by way of example and not limitation, the shaft 120 may have a diameter of, for example, about ½ inch. The reducer 122 may thus have a slightly larger inner diameter, and thus may be configured to fit over a pipe that has a ½ inch inner diameter; for example, the reducer 122 may have an inner diameter of about ⅝ inch or ¾ inch. The barrel 102 may be larger to accommodate the tip 110 and may, for example, have an inner diameter of about one inch. Further, in some embodiments, the barrel 102 may have an overall length from the action end 114 to the muzzle end 112 of at least about 17 inches, but in other embodiments, may be shorter, e.g., at least about 10 inches, at least about 7 inches, or less.

Turning now to the handle 104 in greater detail, according to an embodiment, the handle 104 may extend at a non-zero angle with respect to the barrel 102, e.g., at substantially a 90 degree angle with respect thereto. In other embodiments, other angles may be employed, e.g., generally between about 45 degrees and about 135 degrees with respect to the section of the barrel 102 extending from the handle 104 toward the muzzle end 118.

The handle 104 may extend away from the barrel 102, forming a grip 124. The grip 124 may extend transversely to the barrel 102 and may terminate at a pommel 126. At the pommel 126, the grip 124 may connect with a protective guard 128. The guard 128 may have a first section 130, which may extend generally parallel to the barrel 102, in a direction toward the muzzle end 112; accordingly, the first section 130 may form an angle generally supplementary with the aforementioned angle formed between the barrel 102 and the handle 104.

The guard 128 may also include a second section 132, which may extend at an angle to the first section 130. In an example, the angle between the second section 132 and the first section 130 may be obtuse, e.g., about 135 degrees. Further, the second section 132 may extend back toward the barrel 102, e.g., while extending away from the grip 124 and toward the muzzle end 112. The guard 128 may also include a third section 134, which may form an obtuse angle of about 225 degrees with respect to the second section 132, such that, for example, the third section 134 extends generally parallel to the barrel 102, and is located proximal thereto (e.g., more closely proximal than the first section 130 of the guard 128).

The guard 128 may terminate at the third section 134, and may include a cap keeper 136 at this terminus. The cap keeper 136 may cover the guard 128, which may be hollow, as shown. In some embodiments, the cap keeper 136 may be sized and configured to receive and temporarily retain the end cap 116 thereon. For example, by gently pushing the end cap 116 onto the cap keeper 136, friction forces therebetween may prevent displacement of the end cap 116 from around the cap keeper 136. In other embodiments, the cap keeper 136 may be threaded, made from a resilient (e.g., elastomeric material) or otherwise formed to facilitate the cap keeper 136 holding the end cap 116. The third section 134 may be proximal to but spaced apart from the barrel 102, such that, in some embodiments, the elastic member 106 may be received around the guard 124, between the barrel 102 and the third section 134.

In an embodiment, the elastic member 106 may be an elastomeric (e.g., rubber) band, tube, or the like. As noted above, the elastic member 106 may be received between the guard 124 and the barrel 102, and may be moved along the guard 124 until received around the handle 104, e.g., the grip 124 thereof (as illustrated). As another option, the elastic member 106 may be held by the user in the hand that grips the handle 104 at the grip 124.

The elastic member 106 may also be coupled with an end 138 of the shaft 120. In an embodiment, the elastic member 106 may be received through a line 140 threaded through a hole in the shaft 120. In some embodiments, the elastic member 106 may be coupled with the end 138 by a pin or another rigid member that is received through or otherwise coupled with the shaft 120. For example, the rigid member may provide a T-grip on the end 138 of the shaft 120, facilitating drawing back the end 138 for launching the spear 108.

The line 140 (or pin, rigid member, etc.), and potentially the elastic member 106 as well, may prevent the end 138 of the shaft 120 from proceeding through the action end 114 of the barrel 102 or through the reducer 122, or both, e.g., when the spear 108 is launched using the device 100. Accordingly, the spear 108 may be prevented from being displaced entirely from the barrel 102 during a shot, while allowing for a range of motion for the tip 110 out of the muzzle end 112 of the barrel 102.

Figure 2:
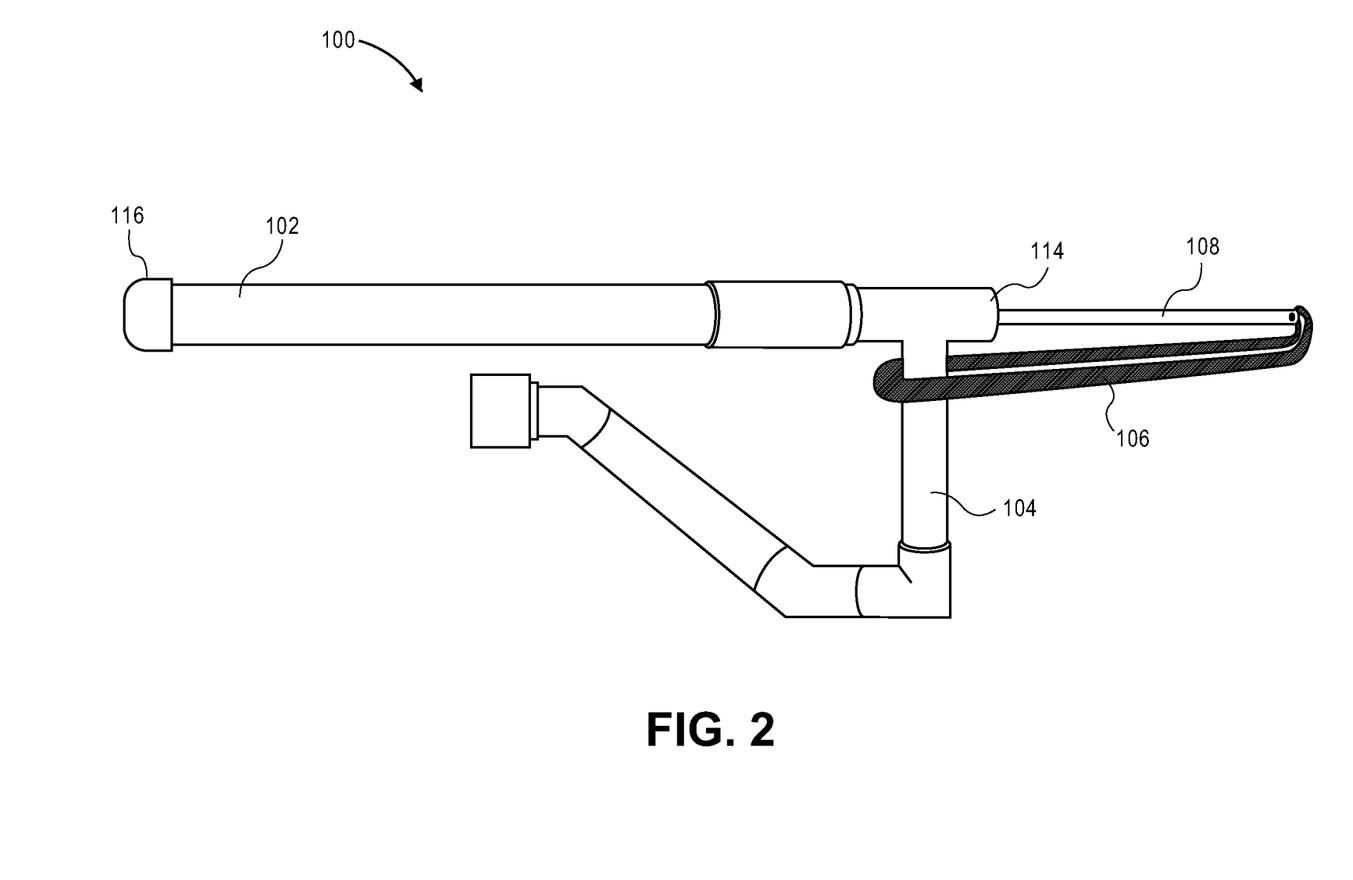
FIG. 2 illustrates a side, perspective view of the spear launching device with the spear stowed in the barrel, according to an embodiment.
Figure 3:
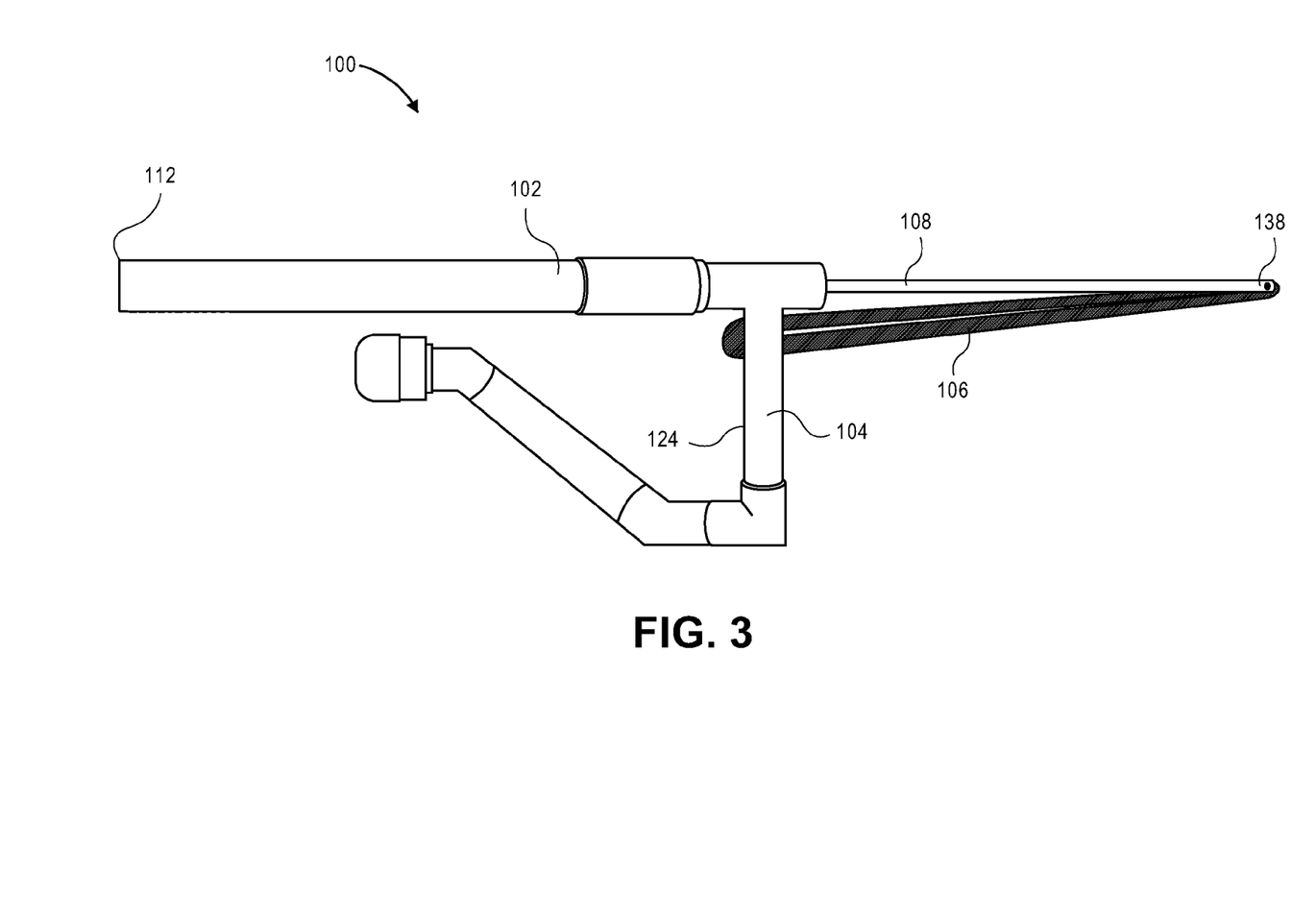
FIG. 3 illustrates a side, perspective view of the spear launching device with the end cap removed and the end of the spear drawn back, in a ready-to-launch position, according to an embodiment.
Figure 4:
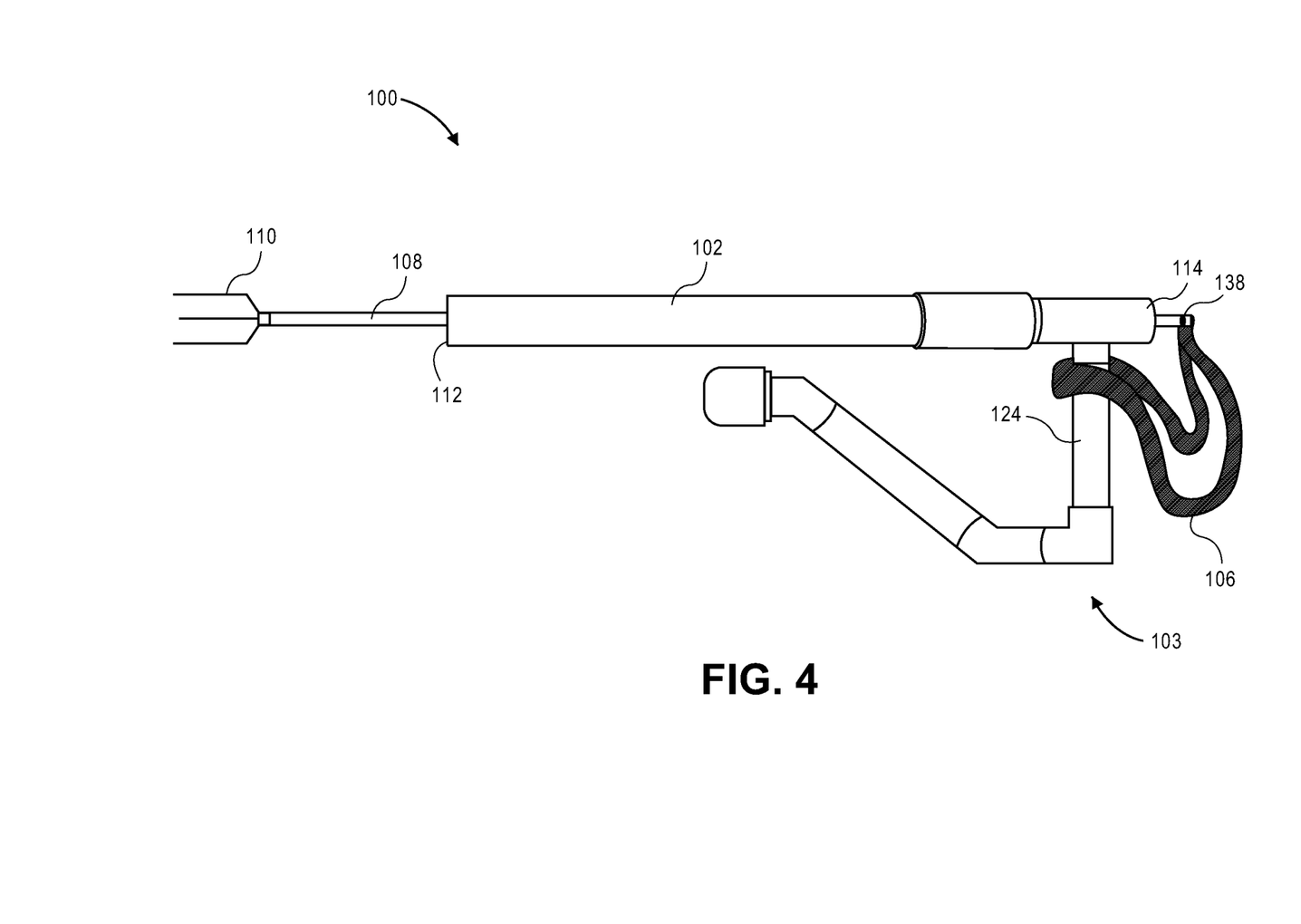
FIG. 4 illustrates a side, perspective view of the spear launching device upon launching the spear, according to an embodiment.

FIGS. 2-4 illustrate three side views of the device 100 at different points during operation thereof, according to an embodiment. Referring to FIG. 2, as shown, prior to or after a shot, the tip 110 may be safely stored in the barrel 102 (and is thus not visible in FIG. 2). With the end cap 116 secured to the muzzle end 112, and the reducer 122 (and/or the action end 114 itself) preventing the tip 110 from exiting the barrel 102 through the action end 114, the tip 110 may be enclosed within the barrel 102 and prevented from puncturing any external structures. In this state, the elastic member 106 may be slack, or it may be slightly stretched, so as to restrain movement of the tip 110 of the spear 108 within the barrel 102. As will be appreciated though, in this configuration, the device 100 may be safely stowed, but also easily readied for launch.

FIG. 3 illustrates the device 100 in a ready-to-launch state, according to an embodiment. As shown, the end cap 116 has been removed, exposing and opening the muzzle end 112 of the barrel 102. Further, the end 138 of the shaft 120 of the spear 108 has been drawn back, away from the action end 114, e.g., using a user's hand. This may create tension in the elastic member 106, as it may be stretched between the end 138 and the handle 104 (e.g., the grip 124). The user's other hand may grip the handle 104, e.g., at the grip 124, to support the tension force on the handle 104 transmitted by the elastic member 106.

FIG. 4 illustrates the device 100 in a launched state, according to an embodiment. When the user is ready to launch the spear 108, the user releases the end 138 thereof. The potential energy stored in the stretched elastic member 106 is thereby converted into kinetic energy as the elastic member 106 snaps back to its unstretched length. This propels the tip 110 of the spear 108 out of the muzzle end 112, without a need for a trigger mechanism (although one could be employed in some embodiments). The tip 110 may continue to move away from the muzzle end 112 until movement thereof is arrested by the end 138 engaging the reducer 122 (or the action end 114, if the action end 114 is closed but for an aperture). Thus, the device 100 provides for a limited range of movement for the tip 110 out of the barrel 102.

Upon spearing a fish (e.g., a lionfish), the user may again grip the end 138, to draw the fish toward the muzzle end 112. The user may continue to draw the end 138 back, such that the tip 110 is moved back within the barrel 102, thereby employing the muzzle end 112 of the barrel 102 to remove the fish from the barbed tip 110, without necessitating a user to touch, or potentially even bring his or her hands near to, the fish. This may serve to prevent barbs, spines, sharp fins, or other hazards from contacting a user's hands.

As will be appreciated, in the illustrated embodiment, the elastic member 106 extends away from the central axis of the barrel 102, e.g., toward the pommel 126 so as to be wrapped around the handle 104, e.g., the grip 124, which may provide a secure, convenient, and natural location for transmitting force to the user's hand and arm holding the device 100 steady during a shot. The reducer 122 ensures that the shaft 120 extends straight in the barrel 102, despite the angled tension force supplied by the elastic member 106 when the end 138 of the shaft 120 is drawn back during a shot. Further, the guard 128 extends forward of the user's hand, toward the muzzle end 112, thereby shielding the user's hand from hazards that may come into proximity with the muzzle end 112, e.g., fin rays of a lionfish.

Figure 5:
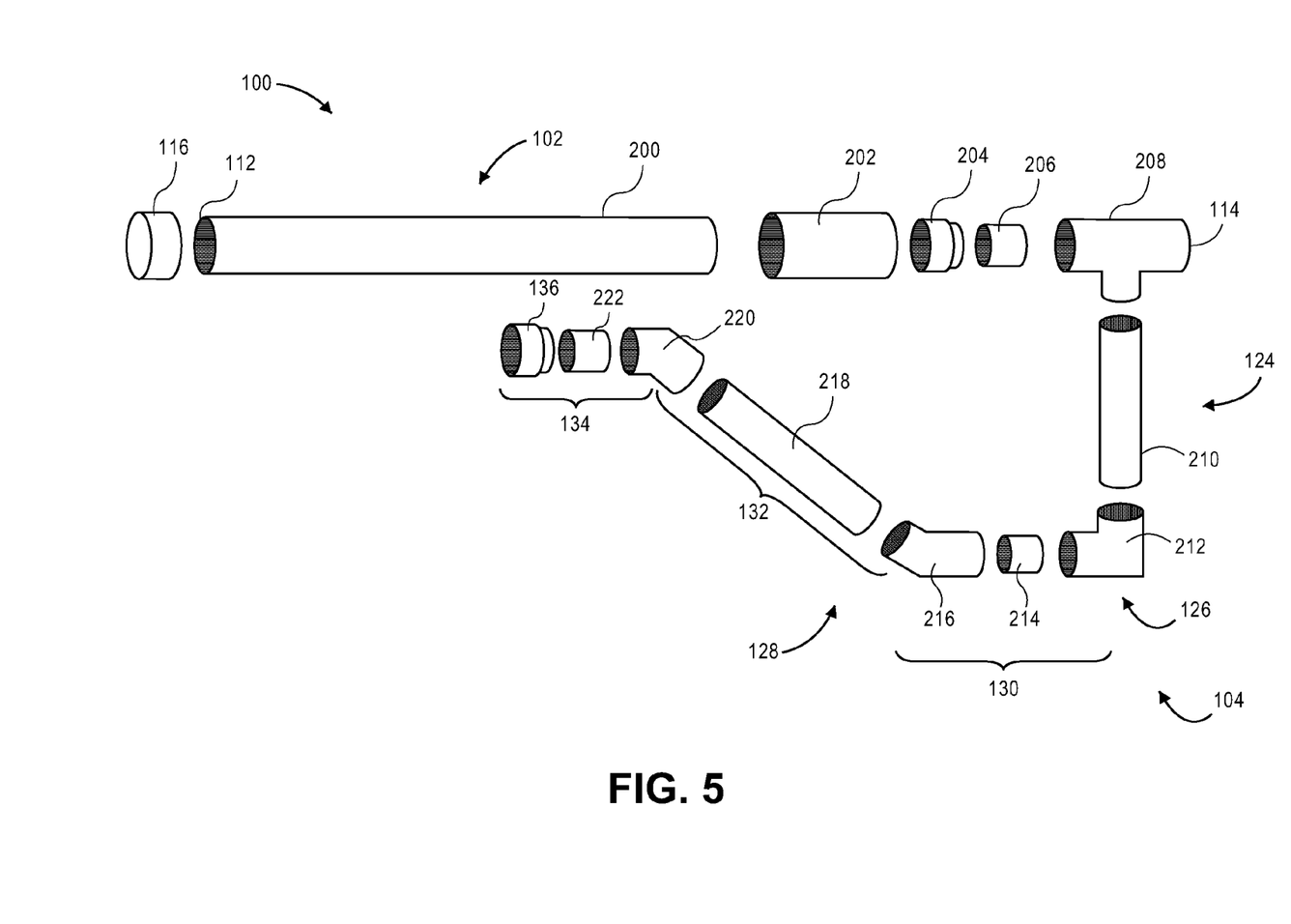
FIG. 5 illustrates an exploded, perspective view of the body of the spear launching device, according to an embodiment.

With additional reference to FIG. 1, FIG. 5 illustrates an exploded view of the barrel 102 and the handle 104 of the device 100, according to an embodiment. As mentioned above, the barrel 102 and the handle 104 may be formed from PVC, e.g., off-the-shelf couplings and pipe segments, in some embodiments. In other embodiments, the barrel 102, the handle 104, the reducer 122 (or any sub-components thereof) may be molded and/or may be otherwise integrally formed from a single piece, or at least fewer pieces than illustrated. Accordingly, this exploded view is one example of the possible construction, but is not to be considered limiting unless otherwise stated herein.

In the illustrated embodiment, the barrel 102 includes a first tubular or "main" section 200 that provides the muzzle end 112 and extends therefrom. In some embodiments, the main section 200 may have roughly a one inch inner diameter and may extend 13 or more inches axially. In other embodiments, other diameters may be employed and the axial length may be greater or shorter (e.g., about 6 inches or less).

The main section 200 may be connected to a coupling 202, which may be received around and connected with the main section 200. A bushing 204 may be received into an opposite end of the coupling 202, and a stub 206 may be received into the bushing 204, as well as a T-coupling 208. The stub 206 and the bushing 204 may together provide the reducer 122 (FIG. 1). The T-coupling 208 may provide the action end 114, opposite to the stub 206, at least in the illustrated embodiment. The T-coupling 208 may also be connected to the grip 124 of the handle 104, provided by another tubular section 210.

The tubular section 210 may be coupled with an elbow 212, which may provide the pommel 126. The elbow 212 may be connected with another stub 214, which may be connected with an angle coupling (e.g., a 45-degree coupling) 216. The elbow 212, stub 214, and angle coupling 216 may together provide the first section 130 of the guard 128.

The angle coupling 216 may be coupled with a tubular section 218. The tubular section 218 may be coupled with an angle coupling (e.g., another 45-degree coupling) 220. The angle couplings 216, 220, and the tubular section 218 may together provide the second section 132 of the guard 128. The angle coupling 220 may be connected to a stub 222, which may be connected with the cap keeper 136, thereby providing the third section 134 of the guard 128.

One, some, or each of the connections and couplings may be bonded together using an adhesive, such as PVC cement. In other embodiments, one, some, or all of the connections may be threaded together, fastened together, coupled together using compression couplings, soldered, welded, brazed, or connected together using any suitable connection technique. Further, as noted above, in some embodiments, one or more of the segments/couplings may be formed as a single piece. Finally, although particular angles for the angle couplings 216, 220, the T-coupling 208, and the elbow 212 are shown and described, it will be appreciated that this is merely by way of example, and not to be considered limiting unless otherwise expressly stated herein.

Figure 6:
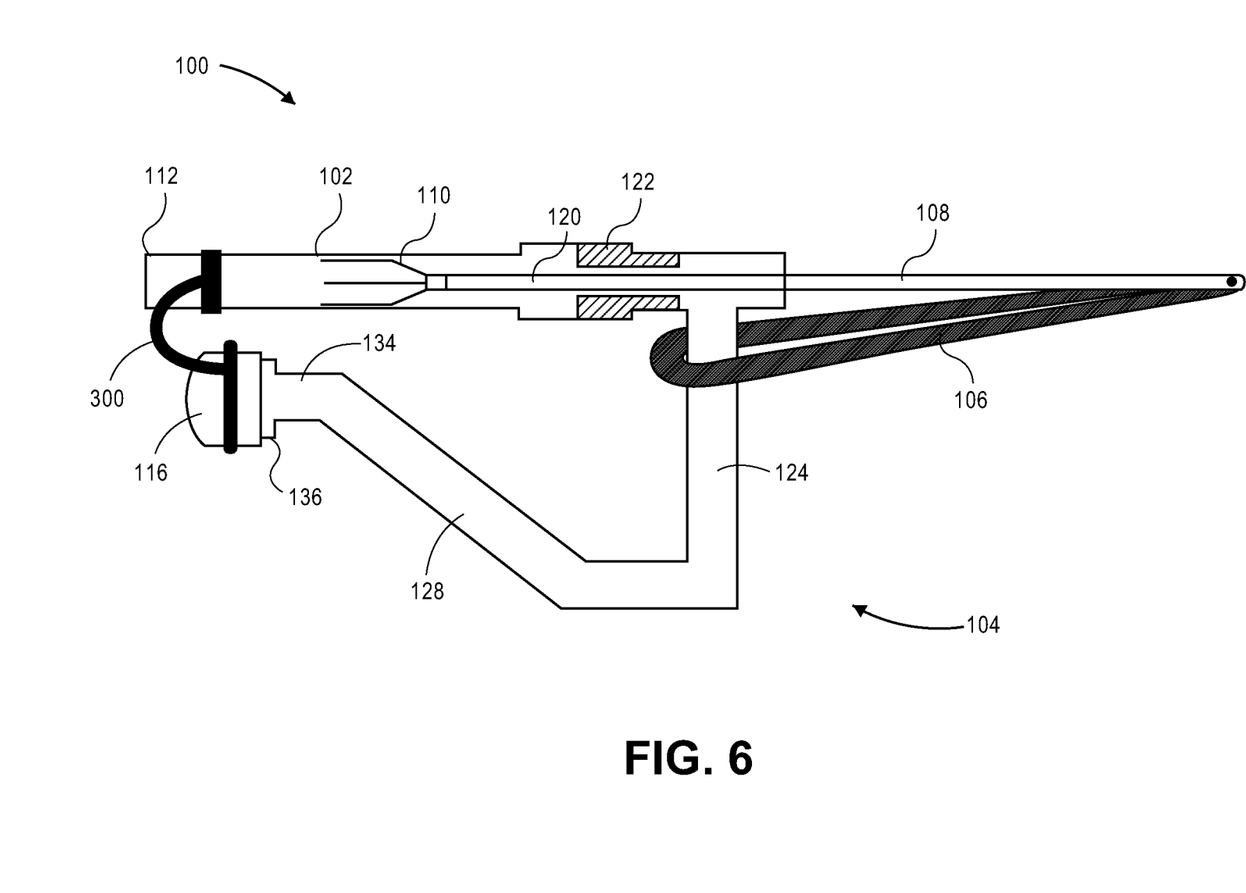
FIG. 6 illustrates a side, partially cross-sectional view of another embodiment of the spear launching device.

FIG. 6 illustrates a side, partial cross-sectional view of another embodiment of the device 100. This embodiment may be generally similar to the embodiments described above, but may include a shorter barrel 102, e.g., in comparison to the extent of the guard 128 from the grip 128, as shown in FIG. 1. As such, the muzzle end 112 may be closer to the third section 134, and in particular to the cap keeper 136. For example, the muzzle end 112 and the end (e.g., cap keeper 136) of the guard 124 may be nearly aligned. As such, the guard 128 may play a more central protective role, serving to assist in removal of a fish from the tip 110 upon retraction of the tip 110 into the barrel 102 after a shot. Thus, rather than coming into proximity with a user's hand and potentially causing injury, hazards presented by the anatomy of the fish may be kept at a distance by the guard 128 assisting in pushing the fish off of the tip 110, away from the user's hand.

Further, with the muzzle end 112 in such close proximity, a relatively short tether 300 may be provided, and may be affixed to the barrel 102, near the muzzle end 112, and to the end cap 116. Upon removal, the user may keep the end cap 116 affixed to the tether 300, and receive the end cap 116 onto the cap keeper 136. Thus, the device 100 may provide a dual mechanism for preventing loss of the end cap 116. Further, with the shorter barrel 102, the same size shaft 120 may afford a longer striking distance, allowing the user to stay farther away from the fish during the shot. This may enhance the likelihood of a successful shot by reducing the risk of the fish being "spooked" and swimming away, while providing a larger safety distance between the user and the fish.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device for launching and storing a spear, comprising:
a barrel having a muzzle end and an action end, wherein the barrel is configured to slidably receive at least a portion of the spear through the muzzle end and the action end, such that a tip of the spear is positioned within the barrel and an end of the spear extends out of the barrel through the action end; and
a handle extending at a non-zero angle to the barrel, wherein the handle comprises:
a grip that is configured to be gripped by a user when launching the spear; and
a rigid protective guard coupled with the grip and extending therefrom at least partially in a direction toward the muzzle end of the barrel,
wherein the guard is configured to prevent the user's hand from touching a fish speared by the spear as the spear is retracted in the barrel.

2. The device of claim 1, wherein the grip is configured to receive an elastic member at least partially around the grip, the elastic member being coupled with the end of the spear, such that the elastic member extends at an angle with respect to a central axis of the barrel, when the spear is pulled to tension the elastic member.

3. The device of claim 2, wherein an end of the guard is spaced apart from the barrel, so as to receive the elastic member between the guard and the barrel and onto the handle.

4. The device of claim 3, wherein the handle further comprises a pommel, the grip extending from the barrel to the pommel, and wherein the elastic member extends away from the central axis, toward the pommel as proceeding along the elastic member and toward the handle.

5. The device of claim 4, wherein the guard comprises:
a first section that extends from the pommel and in a direction substantially parallel to the barrel;
a second section that extends from the first section and defines an obtuse angle with respect to the first section, such that the second section extends toward the muzzle end of the barrel; and
a third section that extends from the second section and defines an obtuse angle with respect to the second section, such that the third section extends substantially parallel to the barrel.

6. The device of claim 5, further comprising:
an end cap receivable onto the muzzle end of the barrel, to prevent the tip from moving out of the muzzle end of the barrel, wherein the end cap is removable from the muzzle end; and
a cap keeper coupled to the third section of the guard, wherein the cap keeper is configured to receive and at least temporarily retain the end cap.

7. The device of claim 6, further comprising a tether coupled with the barrel and the end cap, wherein the end cap is coupled with the tether both when the end cap is attached to the barrel and when the end cap is received onto the cap keeper.

8. The device of claim 7, further comprising a reducer positioned in the barrel, to guide the spear, wherein the barrel comprises a first tubular section, a first coupling, and a T-coupling, and wherein the reducer comprises a bushing received into the first coupling and a stub connecting the bushing and the T-coupling.

9. The device of claim 8, wherein the handle comprises:
a second tubular section coupled to the T-coupling;
an elbow coupled with the second tubular section;
a third tubular section coupled to the elbow;
a first angle coupling coupled to the third tubular section; and
a fourth tubular section coupled to the first angle coupling.

10. The device of claim 9, wherein the handle further comprises a second angle coupling coupled to the fourth tubular section, and a second stub coupled to the second angle coupling, wherein the device further comprises a cap keeper that is coupled to the second stub.

11. The device of claim 1, wherein an elastic member is coupled with the spear, and wherein the grip of the handle is configured to be gripped by a hand of the user, wherein the hand of the user also holds the elastic member.

12. The device of claim 1, further comprise a reducer disposed within the barrel, the reducer being configured to guide a shaft of the spear and to prevent the tip of the spear from sliding therepast.

13. The device of claim 12, wherein the action end is open, and wherein the reducer is further configured to prevent the end of the spear from sliding therepast.

14. The device of claim 12, wherein the barrel has a first diameter section extending from the muzzle end, a second diameter section that is larger in diameter than the first diameter section and that extends from the first diameter section, and a third diameter section that has is smaller in diameter than the first diameter section, the third diameter section extending from the second diameter section to the action end.

15. The device of claim 14, wherein the reducer is positioned in the second diameter section.

16. The device of claim 1, wherein the handle and the barrel are integrally-formed.

17. The device of claim 1, wherein the device does not include a trigger.

18. The device of claim 1, wherein the grip extends transversely to the barrel.

19. A device for launching and storing a spear, comprising:
a barrel having a muzzle end and an action end, wherein the barrel is configured to slidably receive at least a portion of the spear through the muzzle end and the action end, such that a tip of the spear is positioned within the barrel and an end of the spear extends out of the barrel through the action end; and
a handle extending at a non-zero angle to the barrel, wherein the handle comprises:
a grip that is configured to be gripped by a user when launching the spear; and
a protective guard comprising an end, the protective guard being coupled with the grip and extending therefrom to the end of the guard, at least partially in a direction toward the muzzle end of the barrel, such that the muzzle end of the barrel is closer to the end of the guard than to any portion of the grip, the guard being configured to assist in dislodging the spear when the spear is retracted into the barrel.

20. A device for launching and storing a spear, comprising:
a barrel having a muzzle end and an action end, wherein the barrel is configured to slidably receive at least a portion of the spear through the muzzle end and the action end, such that a tip of the spear is positioned within the barrel and an end of the spear extends out of the barrel through the action end; and
a handle extending at a non-zero angle to the barrel, wherein the handle comprises:
a grip that is configured to be gripped by a user when launching the spear; and
a protective guard made at least partially of the same material as the handle and comprising an end, the protective guard being coupled with the grip and extending therefrom to the end of the guard, at least partially in a direction toward the muzzle end of the barrel, such that the muzzle end of the barrel is closer to the end of the guard than to any portion of the grip, the guard being configured to assist in dislodging the spear when the spear is retracted into the barrel.

\* \* \* \* \*